United States Patent [19]
Wada et al.

[11] Patent Number: 5,609,807
[45] Date of Patent: Mar. 11, 1997

[54] PRODUCTION OF CERAMIC STRUCTURAL BODIES

[75] Inventors: Yukihisa Wada, Aichi-gun; Shinobu Naito; Kazuhiko Kumazawa, both of Nagoya, Japan

[73] Assignee: NGK Insulators, Ltd., Japan

[21] Appl. No.: 331,909

[22] Filed: Oct. 31, 1994

[30] Foreign Application Priority Data

Nov. 10, 1993 [JP] Japan .................................. 5-281306

[51] Int. Cl.$^6$ .................................................. B28B 3/20
[52] U.S. Cl. ................ 264/177.11; 264/63; 264/211.11; 264/177.12
[58] Field of Search ............................ 264/63, 211.11, 264/177.11, 177.12

[56] References Cited

U.S. PATENT DOCUMENTS

| | | | |
|---|---|---|---|
| 4,485,182 | 11/1984 | Enomoto et al. | 501/151 |
| 4,721,599 | 1/1988 | Nakamura | 419/23 |
| 4,769,212 | 9/1988 | Nakamura et al. | 419/28 |
| 4,913,737 | 4/1990 | Nakamura et al. | 75/228 |
| 5,132,255 | 7/1992 | Takeuchi et al. | 501/94 |
| 5,240,659 | 8/1993 | Ichitsuka et al. | 264/63 |

FOREIGN PATENT DOCUMENTS

| | | |
|---|---|---|
| 0134277 | 3/1985 | European Pat. Off. . |
| 0353523 | 2/1990 | European Pat. Off. . |
| 0115104 | 8/1994 | European Pat. Off. . |
| 2-255576 | 10/1990 | Japan . |
| 2081733 | 2/1992 | United Kingdom . |

*Primary Examiner*—Christopher A. Fiorilla
*Attorney, Agent, or Firm*—Parkhurst, Wendel & Burr, L.L.P.

[57] ABSTRACT

A process for producing a ceramic structural body, including the steps of formulating a ceramic body by incorporating 0.2 to 3 wt % of emulsified wax and 2 to 7 wt % of methyl cellulose and plasticizing the resulting mixture for extrusion, and extruding the ceramic body.

4 Claims, No Drawings

PRODUCTION OF CERAMIC STRUCTURAL BODIES

BACKGROUND OF THE INVENTION

(1) Field of the Invention

The present invention relates to a process for producing ceramic structural bodies by extrusion.

(2) Related Art

In general, it is a conventional practice that a ceramic body is obtained by mixing a solvent, a shaping aid such as a binder and a surface active agent at need with a ceramic raw material and kneading the mixture, and ceramic structural bodies are produced by extruding the ceramic body by using a ceramic structural body-extruding die. The ceramic structural body-extruding die has a structure provided with discharge channels in the form of a slot-shaped lattice and feed passages for dividingly feeding the ceramic body to intersections of the slots of the lattice.

As the shaping aid to be used for the formation of the ceramic body, an appropriate one has been selected heretofore, depending upon uses, among organic binders such as methyl cellulose, carboxymethyl cellulose and polyvinyl alcohol, surface active agents and wax, as disclosed in unexamined Japanese patent application Laid-open No. 2-255,576.

When the ceramic body is extruded through the above-mentioned die provided with the discharge channels in the form of the slot-shaped lattice and the feed passages for dividingly feeding the ceramic body to intersections of the slots of the lattice, the following defects occur. That is, when the above conventional ceramic body is used, an outer peripheral surface of the extrudate becomes rough due to frictional resistance between the ceramic body and the wall surfaces of the metal die. Consequently, a surface portion of the extrudate is stripped or cracked. Further, ribs (walls) constituting the lattice are waved in an extruding direction. Furthermore, the ribs are extruded, but not united to form the lattice.

It is known that the above phenomenon becomes more conspicuous, as the hardness of the ceramic body increases and/or as the fluidity (plastic deformation) drops. However, if hardness of the ceramic body is merely lessened to enhance the fluidity, there occurs the problems in that the extruded ceramic structural body is deformed due to its self-weight or the extrudate is easily deformed with external forces such as vibration generated in the succeeding step.

On the other hand, as mentioned above, it is formerly known that solid wax is incorporated into the ceramic body. However, wax is not dissolved into water, and difficult to be uniformly dispersed into the ceramic body. Accordingly, uniform ceramic body cannot be obtained, and no sufficient effect can be obtained.

SUMMARY OF THE INVENTION

The present invention is to solve the above-mentioned problems, and to provide a process for producing a process for producing ceramic structural bodies by using a ceramic body which assures good shape-retaining property after extruding and good lubricity.

The process for producing the ceramic structural bodies is characterized in that a ceramic body is prepared by incorporating 0.2 to 3 wt % of emulsified wax and 2 to 7 wt % of methyl cellulose into a ceramic raw material and plasticizing the resulting mixture for extrusion, and the ceramic structural body is produced by extruding the ceramic body. More preferably, the ceramic body is obtained by further incorporating 2 to 3 wt % of at least one kind of a soap-based surface active agent, an ester-based surface active agent and an ether-based surface active agent into the above mixture, and the thus obtained ceramic body is extruded. The above wt % is based on 100 wt % of the ceramic starting material.

As mentioned above, the present invention is based on the discovery in the above construction that when a given amount of emulsified wax and a given amount of methyl cellulose are incorporated as a shaping aid into the ceramic body to be used for extruding the ceramic structural body, the ceramic structural body assuring the shape-maintaining property after extruding and good lubricity can be obtained.

In the present invention, it is particularly important to use wax in the emulsified form, not in the solid form. As is clear from examples mentioned later, if the use amount of the emulsified wax is less than 0.2 wt %, a lubricity-improving effect is not obtained, and the surface portion of the outer wall is torn off or cracked or the ribs are waved. If the use amount is more than 3 wt %, the shape-maintaining property is deteriorated because of decreased buckling strength, and the ceramic structural body may be deformed due to the self-weight or external force. Thus, the use amount of the emulsified wax is set at 0.2 to 3 wt %. As a solvent of the emulsified wax, water is used. The use amount of the emulsified wax is a use amount of solid wax as a solute. The emulsification in the present invention may be carried out by the ordinary process.

As the emulsified wax, at least one kind of paraffinic wax, polyethylene wax, oxidized polyethylene wax and glycol-modified oxidized polyethylene wax may be used in the emulsified form.

As the surface active agent used in the present invention, soap-series surface active agents such as potassium laurate soap and sodium oleate, ester-series surface active agents such as olelate esters, sorbitane ester and stearate ester, and ether-series surface active agents such as laurate ether and oleate ether are preferred. The lubricity-improving effect and the shape-maintaining effect can be obtained when at least one kind of the soap-series surface active agent, the ester-series surface active agent and the ether-series surface active agent is incorporated into the ceramic body, so that the outer wall and the ribs having excellent property can be obtained.

Any ceramic starting material may be used irrespective of the composition thereof as long as ceramic honeycomb structural bodies having thin ribs (not more than 140 μm) can be extruded by using a die. As such a ceramic starting material, cordierite may be recited by way of example.

Referring to cordierite by way of example, the ceramic honeycomb structural body to which the producing process according to the present invention is applicable may be obtained as follows:

A cordierite raw material is formulated by mixing talc, kaoline, alumina and other cordierite starting components to give 42–56 wt %, preferably 47–53 wt %, of $SiO_2$, 30–45 wt %, preferably 32–38 wt %, of $Al_2O_3$, and 12–16 wt %, preferably 12.5–15 wt %, of MgO around a theoretical composition point ($2MgO \cdot 2Al_2O_3 \cdot 5SiO_2$) formerly known as the composition of low expansion cordierite ceramic, and adding 0.2–3 wt % of emulsified wax and 2–7 wt % of methyl cellulose, and preferably further at least one kind of the soap-series, ester-series and ether-series surface-active agents to the resulting mixture, and mixing, kneading and plasticizing the mixture to be extruded. The plasticized mixture is extruded in the form of a structural body, and the resulting extrudate is dried to obtain a ceramic honeycomb structural body.

In the following, actual examples are explained together with comparative examples.

First, each of ceramic bodies having respective compositions shown in Table 1 is kneaded, thereby obtaining Sample Nos. 1 thorough 13 having different properties. Among them, Sample Nos. 1–5 belong to comparative examples, and Sample Nos. 6–13 belong to examples of the present invention.

TABLE 1

| Sample No. | Ceramic raw material (wt %) | Emulsified wax (wt %) | Binder (wt %) | Surface-active agent (wt %) | Solvent (wt %) |
|---|---|---|---|---|---|
| Comparative Example | | | | | |
| 1 | Cordierite raw material (100) | not added | Methyl cellulose (4) | Stearic acid ester (1) | Water (35) |
| 2 | Cordierite raw material (100) | not added | Methyl cellulose (4) | Stearic acid ester (1) | Water (40) |
| 3 | Cordierite raw material (100) | Solid polyethylene wax (1) | Methyl cellulose (4) | Oleic acid ester (1) | Water (35) |
| 4 | Cordierite raw material (100) | Polyethylene wax (0.1) | Methyl cellulose (4) | Oleic acid ester (1) | Water (35) |
| 5 | Cordierite raw material (100) | Polyethylene wax (4) | Methyl cellulose (4) | Oleic acid ester (1) | Water (35) |
| Example | | | | | |
| 6 | Cordierite raw material (100) | Polyethylene wax (1) | Methyl cellulose (4) | not added | Water (35) |
| 7 | Cordierite raw material (100) | Polyethylene wax (1) | Methyl cellulose (4) | Stearic acid ester (1) | Water (35) |
| 8 | Cordierite raw material (100) | Polyethylene wax (1.5) | Methyl cellulose (4) | Oleic acid ester (1) | Water (35) |
| 9 | Cordierite raw material (100) | Paraffin wax (1) | Methyl cellulose (2) | not added | Water (35) |
| 10 | Cordierite raw material (100) | Paraffin wax (1) | Methyl cellulose (2) | Soda oleate soap (3) | Water (35) |
| 11 | Cordierite raw material (100) | Polyethylene wax (0.5) | Methyl cellulose (4) | Potassium laurate soap (0.5) | Water (35) |
| 12 | Cordierite raw material (100) | Oxidized polyethylene wax (0.2) | Methyl cellulose (7) | Lauryl ether (0.5) | Water (30) |
| 13 | Cordierite raw material (100) | Oxidized polyethylene wax (3) | Methyl cellulose (7) | Oleyl ether (0.2) | Water (30) |

Table 2 shows various properties of Sample Nos. 1 to 13 as the ceramic bodies shown in Table 1.

The properties of the ceramic bodies were measured or evaluated as follows:

(1) Penetrating resistance:

Resistance when a spherical ball having a diameter of 5 mm was penetrated into each Sample in a given time was measured by a rheometer.

(2) Pseudo-plastic index:

A pseudo-plastic index is determined by passing a body through a die with a round hole having a diameter of 5 mm and a length of 15 mm, drawing a graph in logarithm abscissa and ordinate with respect to the relation between an extruding pressure and an extruding speed at that time, and determining a gradient of the resulting straight line. The smaller the pseudo-plastic index (the gradient of the straight line), the smaller is a change in the extruding speed relative to the extruding pressure so that the body can be more uniformly extruded.

(3) Pressure loss index:

The body is passed through each of a die with a round hole having a diameter of 5 mm and a length of 15 mm and a die with a round hole having a diameter of 5 mm and a length of 75 mm, and a logarithmic graph is drawn with respect to the relationship between the extruding speed and the extruding pressure. With respect to the resulting two straight lines, differences between the extruding pressures in the graph at the same extruding speeds are plotted relative to the extruding speed. The gradient of the thus obtained straight line is taken as a pressure loss index. The smaller the pressure loss index, the smaller is the difference in extruding die at the same extruding speed, that is, the smaller is the dynamic friction between the body and the wall surface of the die.

(4) Shape-maintaining property:

The shape-maintaining property is determined by extruding a honeycomb structural body having a given length (wall thickness: 140 μm, cell density: 400 cells/inch$^2$, 30 mm in square), applying a load upon a central portion of the honeycomb structural body as viewed in the longitudinal direction, and determining a deforming resistance as a buckling strength. The sample having a higher value is indicated as "⊙", that having an intermediate value as "o", and that having a small value as "X". The lower the buckling strength, the more easily is the honeycomb structural body deformed due to the self-weight or external force.

(5) Outer wall surface:

The sample suffering neither surface-peeling nor cracking due to frictional resistance between the body and the metallic wall surface is indicated as "⊙", that suffering small surface-peeling or small cracking as "o", and that suffering large surface-peeling or large cracking as "X".

(6) Rib shape:

The shape of the ribs being not waved is indicated as "⊙", that being slightly waved as "o", and that being largely waved as "x".

(7) Total evaluation:

The sample having excellent outer wall surface, excellent rib shape and excellent shape-maintaining property is indicated as "⊙", that having one or two the "o"s with respect to the outer wall surface, the rib shape and the shape-maintaining property is indicated as "o", and that having at least one "x" with respect to the outer wall surface, the rib shape and the shape-maintaining property is indicated as "X".

TABLE 2

| Sample No. | Penetrating resistance kgf | Pseudo plastic index | Pressure loss index | Buckling strength gf/cm² | Surface of outer wall | Rib shape | Shape-maintaining property | Evaluation |
| --- | --- | --- | --- | --- | --- | --- | --- | --- |
| Comparative Example | | | | | | | | |
| 1 | 1.5 | 7.0 | 0.09 | 55 | × | × | ⊚ | × |
| 2 | 0.9 | 5.5 | 0.07 | 25 | × | × | × | × |
| 3 | 1.4 | 7.0 | 0.09 | unabled to be shaped due to clogging | | | | |
| 4 | 1.5 | 5.2 | 0.07 | 55 | × | × | ⊚ | × |
| 5 | 1.2 | 2.3 | 0.02 | 35 | ⊚ | ⊚ | × | × |
| Example | | | | | | | | |
| 6 | 1.4 | 3.5 | 0.03 | 48 | ⊚ | ⊚ | ⊚ | ⊚ |
| 7 | 1.5 | 4.5 | 0.05 | 55 | ○ | ○ | ⊚ | ○ |
| 8 | 1.4 | 3.0 | 0.03 | 45 | ⊚ | ⊚ | ⊚ | ⊚ |
| 9 | 1.6 | 5.0 | 0.06 | 60 | ○ | ○ | ⊚ | ○ |
| 10 | 1.4 | 3.5 | 0.03 | 45 | ⊚ | ⊚ | ⊚ | ⊚ |
| 11 | 1.5 | 4.0 | 0.04 | 50 | ⊚ | ⊚ | ⊚ | ⊚ |
| 12 | 1.6 | 4.5 | 0.05 | 60 | ○ | ○ | ⊚ | ○ |
| 13 | 1.3 | 2.5 | 0.03 | 40 | ⊚ | ⊚ | ○ | ○ |

From the results in Tables 1 and 2, it is clear that when a cordierite raw material is formulated and 0.2–3 wt % of emulsified wax and 2–7 wt % of methyl cellulose are incorporated into the resulting mixture, and the outer wall surface are less likely to be peeled or cracked due to the frictional resistance between the body and the metallic wall surface on extruding, resulting in the formation of excellent ribs of the lattice with being less waved in the extruding direction. This is considered because when the emulsified wax is added, the pressure loss index decreases, the lubricity is enhanced, and pseudo-plastic index decreases, so that the body is more uniformly extruded under the extruding pressure.

Further, it is considered from the results shown in Tables 1 and 2 that when the pseudo-plastic index is in a range of 2.5–5 and when the pressure loss index is in a range of 0.03 to 0.06, the ceramic honeycomb structural body having the excellent outer peripheral wall and the excellent rib shape can be obtained. The above effects can be obtained more conspicuously in the case where the thickness of the cell walls of the honeycomb structural body is not more than 140 μm, particularly in the case where the thickness of the cell walls of the honeycomb structural body is not more than 120 μm. Furthermore, it is seen from Comparative Examples that if the hardness of the body is merely lowered to enhance fluidity, the extruded honeycomb structural body is deformed due to the self-weight or the honeycomb structural body is more easily deformed by an external force such as vibration occurring in the succeeding step.

When the solid wax is added, it is not sufficiently dispersed into the body because the wax is not dissolved into water. Consequently, the mass of the wax is caught by the lattice-shaped flow passages when the body passes the die, so that the die is clogged with the body. Thus, the honeycomb structural body could not be extruded. This trouble occurred particularly when the cell wall thickness was more than 140 μm. In addition, since wax was not uniformly dispersed in the body, the lubricity could not be improved. To the contrary, when emulsified wax is added, wax is excellently dispersed in the body. Thus, uniform body is obtained to improve lubricity.

As is clear from the afore-mentioned explanation, according to the present invention, the frictional resistance between the body and the wall surfaces of the discharge passages and feed passages in the die is reduced. Consequently, the peeling and cracking of the outer peripheral surface portion can be prevented, and waving of the lattice-constituting ribs (walls) can be also prevented.

Moreover, since the lubricity is improved without deteriorating the shape-maintaining property according to the present invention, the deformation of the extruded structural body due to the self-weight or by the external force such as vibration occurring in the succeeding step can be prevented. Accordingly, the ceramic structural body having excellent outer peripheral surface, excellent rib shape and excellent outer configuration can be obtained according to the present invention.

What is claimed is:

1. A process for producing a cordierite ceramic structural body, comprising the steps of:

mixing a corderite raw material with 0.2 to 3 wt % of emulsified polyethylene wax, 2 to 7 wt % of methyl cellulose, and 0.2 to 3 wt % of at least one kind of a surface active agent selected from the group consisting of a soap-series surface active agent, an ester-series surface active agent and an ether-series surface active agent;

plasticizing the resulting mixture for extrusion; and extruding the resulting plasticized mixture to form a ceramic structural body.

2. The process of claim 1, wherein said ceramic structural body is a honeycomb structural body having a plurality of cells separated by partition walls of thicknesses not exceeding 140 μm.

3. The process of claim 2, wherein the ceramic structural body has a pseudo-plastic index of 2.5 to 5 and a pressure loss index of 0.03 to 0.06.

4. The process of claim 1, wherein the ceramic structural body has a pseudo-plastic index of 2.5 to 5 and a pressure loss index of 0.03 to 0.06.

* * * * *